US009450752B2

(12) United States Patent
Vimpari et al.

(10) Patent No.: US 9,450,752 B2
(45) Date of Patent: Sep. 20, 2016

(54) METHOD AND APPARATUS FOR PROVIDING SERVICE PROVIDER-CONTROLLED COMMUNICATION SECURITY

(75) Inventors: Markku Kalevi Vimpari, Oulu (FI); Jukka Sakari Alakontiola, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 353 days.

(21) Appl. No.: 13/158,148

(22) Filed: Jun. 10, 2011

(65) Prior Publication Data
US 2012/0275598 A1 Nov. 1, 2012

Related U.S. Application Data

(60) Provisional application No. 61/480,868, filed on Apr. 29, 2011.

(51) Int. Cl.
*G06F 15/16* (2006.01)
*H04L 9/08* (2006.01)
*H04L 9/14* (2006.01)
*H04L 29/06* (2006.01)

(52) U.S. Cl.
CPC ............ *H04L 9/088* (2013.01); *H04L 9/0872* (2013.01); *H04L 9/14* (2013.01); *H04L 63/0428* (2013.01); *H04L 63/205* (2013.01); *H04L 63/107* (2013.01); *H04L 63/30* (2013.01); *H04L 63/304* (2013.01)

(58) Field of Classification Search
CPC ... H04L 9/088; H04L 63/205; H04L 9/0872; H04L 63/0428; H04L 9/14; H04L 63/107; H04L 63/30; H04L 63/304
See application file for complete search history.

(56) References Cited

U.S. PATENT DOCUMENTS

| 5,949,883 | A  | * | 9/1999 | Ford | 380/28 |
| 6,370,629 | B1 | * | 4/2002 | Hastings et al. | 711/163 |
| 6,442,616 | B1 | * | 8/2002 | Inoue et al. | 709/245 |
| 6,704,574 | B2 | * | 3/2004 | Lin | 455/456.3 |

(Continued)

FOREIGN PATENT DOCUMENTS

| WO | WO 99/09765 | * | 2/1999 |
| WO | WO 99/09765 A1 | | 2/1999 |

(Continued)

OTHER PUBLICATIONS

Bogolikos, "Development of Surveillance Technology and Risk of Abuse of Economic Information," European Parliament Scientific and Technological Options Assessment, Oct. 1999, pp. 1-24.

(Continued)

*Primary Examiner* — Krista Zele
*Assistant Examiner* — Anthony Fabbri
(74) *Attorney, Agent, or Firm* — Ditthavong & Steiner, P.C.

(57) ABSTRACT

An approach is provided for service provider controlled communication security. A security platform receives a connection request from a client device. The security platform determines context information associated with the device, access network, a user of the device, or a combination thereof, and then processes and/or facilitates a processing of the context information to determine one or more encryption ciphers to offer for the session. Next, the security platform causes, at least in part, establishment of the connection request using, at least in part, the one of the offered encryption ciphers.

20 Claims, 5 Drawing Sheets

(56) References Cited

U.S. PATENT DOCUMENTS

| | | | |
|---|---|---|---|
| 6,778,837 B2* | 8/2004 | Bade et al. | 455/456.1 |
| 7,177,426 B1* | 2/2007 | Dube | 380/46 |
| 7,890,751 B1* | 2/2011 | Morris et al. | 713/156 |
| 8,218,535 B1* | 7/2012 | Hurtta | H04L 12/4633 370/338 |
| 2002/0049913 A1* | 4/2002 | Lumme | H04L 63/30 726/13 |
| 2002/0112168 A1* | 8/2002 | Filipi-Martin et al. | 713/183 |
| 2003/0014623 A1* | 1/2003 | Freed et al. | 713/150 |
| 2003/0061518 A1* | 3/2003 | Yamaguchi et al. | 713/201 |
| 2003/0065571 A1* | 4/2003 | Dutta | 705/26 |
| 2003/0140246 A1* | 7/2003 | Kammer et al. | 713/201 |
| 2004/0048613 A1* | 3/2004 | Sayers et al. | 455/426.2 |
| 2004/0185875 A1* | 9/2004 | Diacakis | H04L 63/30 455/456.3 |
| 2004/0202295 A1* | 10/2004 | Shen | H04L 29/06 379/112.01 |
| 2005/0027866 A1* | 2/2005 | Seurujarvi | H04M 3/2281 709/227 |
| 2005/0100162 A1* | 5/2005 | Alve et al. | 380/210 |
| 2005/0216754 A1* | 9/2005 | Ehud | 713/193 |
| 2006/0072550 A1* | 4/2006 | Davis | H04L 63/00 370/352 |
| 2006/0093135 A1* | 5/2006 | Fiatal | H04L 63/0428 380/28 |
| 2006/0246920 A1* | 11/2006 | Shim | H04L 63/102 455/456.2 |
| 2006/0259928 A1* | 11/2006 | Di Serio | H04L 63/00 725/62 |
| 2006/0282660 A1* | 12/2006 | Varghese et al. | 713/155 |
| 2007/0061460 A1* | 3/2007 | Khan et al. | 709/225 |
| 2007/0101438 A1* | 5/2007 | Govindarajan | 726/27 |
| 2008/0049926 A1* | 2/2008 | Imbimbo | H04L 12/4641 379/225 |
| 2008/0152343 A1* | 6/2008 | Quan | H04B 10/85 398/45 |
| 2008/0275988 A1* | 11/2008 | Zheng | H04L 29/06027 709/224 |
| 2008/0276294 A1* | 11/2008 | Brady | H04L 63/08 726/1 |
| 2009/0007263 A1* | 1/2009 | Frenkel | H04M 3/2281 726/22 |
| 2009/0034430 A1* | 2/2009 | Popoviciu | H04L 63/00 370/254 |
| 2009/0034510 A1* | 2/2009 | Smoyer et al. | 370/352 |
| 2009/0252151 A1* | 10/2009 | Rappe | H04L 12/2602 370/352 |
| 2009/0254650 A1* | 10/2009 | Sheppard | H04L 63/30 709/224 |
| 2010/0135282 A1* | 6/2010 | Feng | H04L 63/30 370/352 |
| 2010/0299423 A1* | 11/2010 | Kroeselberg | H04L 63/0407 709/223 |
| 2011/0029667 A1* | 2/2011 | Imbimbo | H04W 12/02 709/224 |
| 2011/0150211 A1* | 6/2011 | Anderson | H04L 63/30 380/1 |
| 2011/0176460 A1* | 7/2011 | Iovieno | H04L 63/30 370/259 |
| 2011/0194460 A1* | 8/2011 | Witzel | H04L 63/00 370/259 |
| 2012/0250584 A1* | 10/2012 | Jayaraman | H04L 63/304 370/259 |

FOREIGN PATENT DOCUMENTS

| | | | | |
|---|---|---|---|---|
| WO | WO 9927716 A1 * | 6/1999 | | H04B 7/18567 |
| WO | WO 00/59253 A1 | 10/2000 | | |
| WO | WO 03/007542 A1 | 1/2003 | | |
| WO | WO 2008067849 A1 * | 6/2008 | | H04L 63/30 |
| WO | WO 2011041962 A1 * | 4/2011 | | H04L 63/061 |

OTHER PUBLICATIONS

Denning, "The Future of Cryptography," Oct. 1995, pp. 1-7 (http://encryption_policies.tripod.com/us/denning_1095_future.htm).
International Search Report for PCT/FI2012/050390 dated Sep. 19, 2012, pp. 1-4.
Written Opinion for PCT/FI2010/050290 dated Sep. 19, 2012, pp. 1-7.

* cited by examiner

METHOD AND APPARATUS FOR PROVIDING SERVICE PROVIDER-CONTROLLED COMMUNICATION SECURITY

RELATED APPLICATIONS

This application claims the benefit of the earlier filing date under 35 U.S.C. §119(e) of U.S. Provisional Application Ser. No. 61/480,868 filed Apr. 29, 2011, entitled "Method And Apparatus For Providing Service Provider-Controlled Communication Security," the entirety of which is incorporated herein by reference.

BACKGROUND

Service providers and device manufacturers (e.g., wireless, cellular, etc.) are continually challenged to deliver value and convenience to consumers by, for example, providing compelling network services. As the popularity and scope of these services increases, end users often using the services to store, access, or otherwise manage potentially personal or sensitive information. As a result, one area of development with respect to services has been means for providing end user privacy and security when using these services. However, such means are often be affected or dictated by different regulations, requirements, and/or practices (e.g., Lawful Interception (LI) requirements) associated with the jurisdictions from which end users are accessing the services. Accordingly, access network operators, service providers and device manufacturers face significant technical challenges to providing the privacy and security for users accessing services while also complying with local requirements and providing for efficient operation of the services.

SOME EXAMPLE EMBODIMENTS

Therefore, there is a need for an approach for a service-provider side mechanism for determining an appropriate means (e.g., privacy and/or security protocols) to maximize user privacy requirements while still fulfilling the local requirements.

According to one embodiment, a method comprises receiving a connection request from a device. The method also comprises determining context information associated with the device, a user of the device, or a combination thereof. The method further comprises processing and/or facilitating a processing of the context information to determine one or more encryption ciphers. The method also comprises causing, at least in part, establishment of the connection request using, at least in part, the one or more encryption ciphers.

According to another embodiment, an apparatus comprises at least one processor, and at least one memory including computer program code, the at least one memory and the computer program code configured to, with the at least one processor, cause, at least in part, the apparatus to receive a connection request from a device. The apparatus is also caused to determine context information associated with the device, a user of the device, or a combination thereof. The apparatus is further caused to process and/or facilitate a processing of the context information to determine one or more encryption ciphers. The apparatus is also caused to establish the connection request using, at least in part, the one or more encryption ciphers.

According to another embodiment, a computer-readable storage medium carries one or more sequences of one or more instructions which, when executed by one or more processors, cause, at least in part, an apparatus to receive a connection request from a device. The apparatus is also caused to determine context information associated with the device, a user of the device, or a combination thereof. The apparatus is further caused to process and/or facilitate a processing of the context information to determine one or more encryption ciphers. The apparatus is also caused to establish the connection request using, at least in part, the one or more encryption ciphers.

According to another embodiment, an apparatus comprises means for receiving a connection request from a device. The apparatus also comprises means for determining context information associated with the device, a user of the device, the access network or networks on the route of the connection or a combination thereof. The apparatus further comprises means for processing and/or facilitating a processing of the context information to determine one or more encryption ciphers. The apparatus also comprises means for causing, at least in part, establishment of the connection request using, at least in part, the one or more encryption ciphers.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing service provider-controlled communication security are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
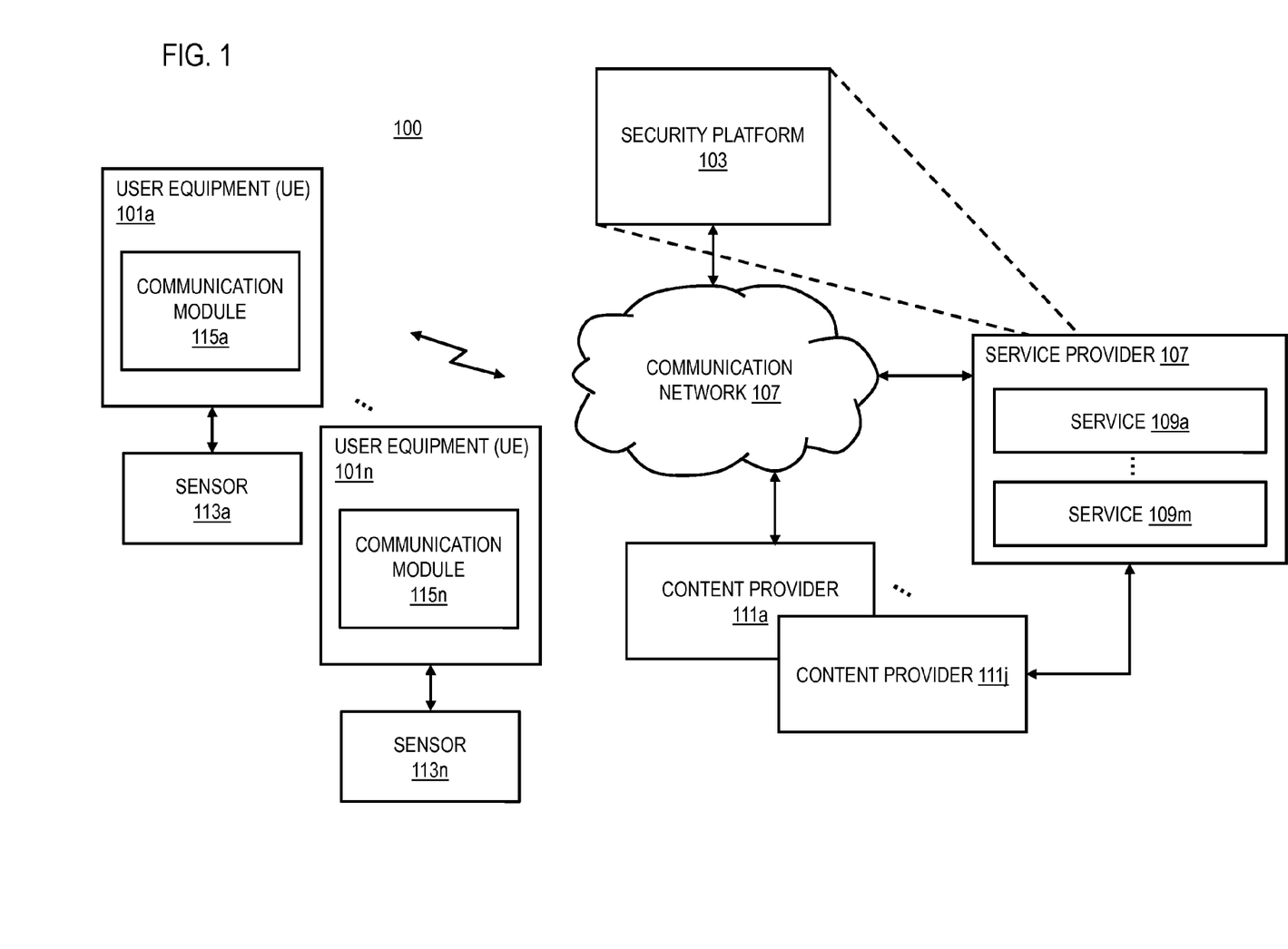
FIG. 1 is a diagram of a system capable of determining an appropriate encryption cipher, according to one embodiment.

FIG. 1 is a diagram of a system capable of determining an appropriate encryption cipher, according to one embodiment. End user privacy and security is a critical issue of concern in providing internet services. A widely applied way of protecting end user data is to use Transport Layer Security (TLS) which was earlier called Secure Socket Layer (SSL) to encrypt data sent over, for example, a Hypertext Transfer Protocol (HTTP) transport. At the same time, in many jurisdictions (e.g., countries and/or other localities), governing authorities have enacted or otherwise implemented regulations or other requirements that control how such data protection is provided. For example, some governing authorities have enacted Lawful Interception (LI) requirements that mandate, for instance, that access network operators and/or service providers provide a way for governments to eavesdrop on internet communications and/or data transfers to end users in their respective jurisdictions regardless of how the data is encrypted. Example communications may include, but are not limited to, emails, web discussion board messages, instant messages, etc. A common claimed reason for allowing a governing authority to eavesdrop is anti-terrorism.

While governing authorities want to have access to view encrypted data, if data protection such as TLS is disabled all together, all of the users of a communication service are vulnerable to abuse in the form of phishing, identity theft or leakage of personal information to third parties, for example.

On the other hand, for example, the European Community has requirements for protecting the end user data. But, even when a communication service is provided in the European Community, a local access network operator may be required to block access to that service if the local access network operation cannot fulfill a governing authority's Lawful Interception (LI) requirements allowing the governing authority to eavesdrop. In other words, the European Community, in this example, wishes to protect the integrity of the end user, which may ultimately conflict with the desire by other jurisdictions to have the ability to view encrypted data.

For service providers who have end users from many different jurisdictions, these contradicting privacy requirements typically can lead the additional burden of having to maintain servers configured specifically to the requirements particular region, which potentially can lead to inefficiencies and problems of scalability and/or load-balancing. In some cases, service provider may resort to not securing internet communication at all, or at least securing the communications in a very weak manner. But, if there is no reasonable means for a governing authority to view internet communications, it may become illegal to provide services to the residents of some countries.

To address this problem, a system 100 of FIG. 1 introduces the capability of determining an appropriate encryption cipher that meets a governing authority's requirements while maintaining the ability for an end user to receive an encrypted dataset at the service-provider end. In one embodiment, the system 100 determines context information (e.g., a location) of a user device that is to receive a dataset by way of an internet communication and selects a cipher such as a TLS cipher based on the context information (e.g., the access network or country where the end user device is resident at the time of the request), so long as the cipher is known and/or required for the particular context (e.g., location or country of origin). Although various embodiments are discussed with location of the end user devices as the context information, it is contemplated that any other context of the device may be used to determine the appropriate security protocol (e.g., encryption cipher) to use. For example, context information such as time of the request, activity at the device, history of user activity at the device, user behavior patterns, or any combination of contexts can be used in the various embodiments described herein.

In one embodiment, if the cipher is not known by the system 100 for the determined context or location, the system 100 will search for an appropriate cipher to determine whether there are any application local requirements before allowing establishment of the communication session for transmission of the dataset. By way of example, the appropriate cipher may be an encryption cipher that the governing authority for the location has set to enable LI (e.g., by specifying an encryption cipher key length for which the governing authority that the governing authority knowingly has the ability to decipher. Such an encryption may also be known as a weak encryption because while the dataset is still encrypted, it may be broken by a select few, or those with superior decryption skills to those of the average consumer. A weak encryption cipher may be, for example, a 40-bit encryption.

In one embodiment, the selection for using weak ciphers may be based on IP subnet lists provided by the access network operator (the ISP or e.g. cellular access network operator) when the LI capability is requested by a governing or security authority of a particular country or location. Alternatively, the selection may be based on statistically determined source IP subnets belonging to certain mobile network operators by mapping the subnets to a mobile country code (MCC) and a mobile network code (MNC) identifies of the operator. The binding between the MNC and MCC and the source address can be made beforehand by some other user or client contacted the service and that information is applied later if the LI capability is requested by the security authorities via the local ISP to the internet service provider.

For networks that the encryption requirements may not be found, or it is known that the governing authority does not require eavesdropping access to a communication or does not need any technical assistance to do that, the system 100 may employ any default security protocol (e.g., a strong TLS cipher)may be used. A strong cipher may be a 256-bit encryption or higher, for example.

In one embodiment, the location of the end user can be detected by analyzing the source Internet Protocol (IP) address from when the Transmission Control Protocol (TCP) connection is established before starting a TLS handshaking, for example. The end user location may also be determined by any means for determining the position of an electronic device such as, for example, global positioning, geolocation, etc. In other embodiments, the location information associated with end user devices may be determined at the respective devices and sent as part of the negotiation and/establishment of a secure communication session between the devices and the service provider.

As shown in FIG. 1, the system 100 comprises user equipment (UEs) 101a-101n (also collectively referred to as UEs 101) having connectivity to a security platform 103 and a service provider 107 via a communication network 105. In one embodiment, the security platform 103 performs various embodiments of the processes associated with determining and/or specifying the appropriate security protocol(s) or cipher(s) for the service provider 107 to respond to one or more communication or service requests from the UEs 101. Although the security platform 103 is depicted as a separate component to the communication network 105, it is contemplated that the security platform 103 and/or one or more of its functions and/or modules by be included in or performed by the service provider 107 and/or any of the services 109a-109m provided by the service provider 107. In this context the functionality may also advantageously be implemented by a load balancer or TLS accelerator that terminates the TLS connection. Such an implementation may handle a TLS negotiation session outside the actual service and even outside the service provider.

In one embodiment, a UE 101 requests to establish a communication session to receive a data transmission from the service provider 107, the services 109, one or more content providers 111a-111j, any other UE 101, or a combination thereof by way of communication network 105. In one embodiment, the security platform 103 (e.g., on behalf or in cooperation with the service provider 107) determines context information of the UE 101 to facilitate determination of an appropriate security protocol. By way of example, if the context information is location information, the security platform 103 determines the location of the UE 101 by analyzing the source Internet Protocol (IP) address from when the Transmission Control Protocol (TCP) connection is established before starting a TLS handshaking In certain embodiments, probe data (e.g., any information or data that may be processed relating to information about a geographic location and any occurrences that may be happening at or near that geographic location) can be periodically or continually processed to determine the location information as well as the identity of the requesting UE 101. Probe data may be geospatial and/or temporal. The probe data may be used for developing a database of information to match encryption requirements for a communication without having to use GPS data or MCC/MNC data from the source device, and/or determining location information such as a country of origin.

In addition or alternatively, the end user location may also be determined by any means for determining the position of an electronic device such as, for example, global positioning, geolocation, etc. In this case, the location information can be sent by the UE 101 to the security platform 103. For example, the location information may be sent as part of the handshaking or negotiating process for establishing the secure connection between the UE 101 and the service provider 107. In other embodiments, the location information can be sent in the same or other communication session to the service provider 107. It is contemplated that the security platform 103 and/or service provider 107 can use any means to authenticate and/or verify the accuracy of the location information including, for instance, making multiple requests or verifying through one or more independent location based services. In another embodiment, the security platform 103 may also base the location determination of the UE 101 on a network code (e.g., a mobile network code (MNC)), a country code (e.g., a mobile country code (MCC)), or any combination thereof that have been pre-collected or determined based on non-personal relational information between the source IP subnets and the MNCs/MCCs.

In one embodiment, the security platform 103 then determines an appropriate encryption cipher or security protocol based on the context information (e.g., location or country of origin) of the UE 101. In some embodiments, the governing authorities may provide ranges or network addresses or other identifiers associated with target UEs 101. In this case, the security platform 103 can compare the network identifier of the requesting UE 101 against the range of addresses provided by the governing authority to apply a security protocol or cipher associated with the range. By placing the logic for dynamically determining on an appropriate security protocol on the network side, the system 100 enables the service provider 107 (e.g., via the security platform 103) to service requests from many different jurisdictions without having to configure individual servers for each jurisdiction with different security requirements. Moreover, the server-side approach described in the various embodiments avoids a need to configure any settings on the client to change security protocols and/or encryption ciphers or even assist the decision with potentially false data.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, personal or impersonal, human or non-human operated, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In addition, the UE 101 may include or have connectivity to one or more sensors 113a-113n (also collectively referred to as sensors 113) for determining or sensing context information (e.g., location, environmental conditions, etc.).

By way of example, the UE 101, security platform 103, and service provider 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the UE 101 (e.g., via the communication module 115 and a client application module 117) and the security platform 103 interact according to a client-server model. It is noted that the client-server model of computer process interaction is widely known and used. According to the client-server model, a client process sends a message including a request to a server process to initiate a secure session (e.g., a TLS session), and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request or initiates the connection, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
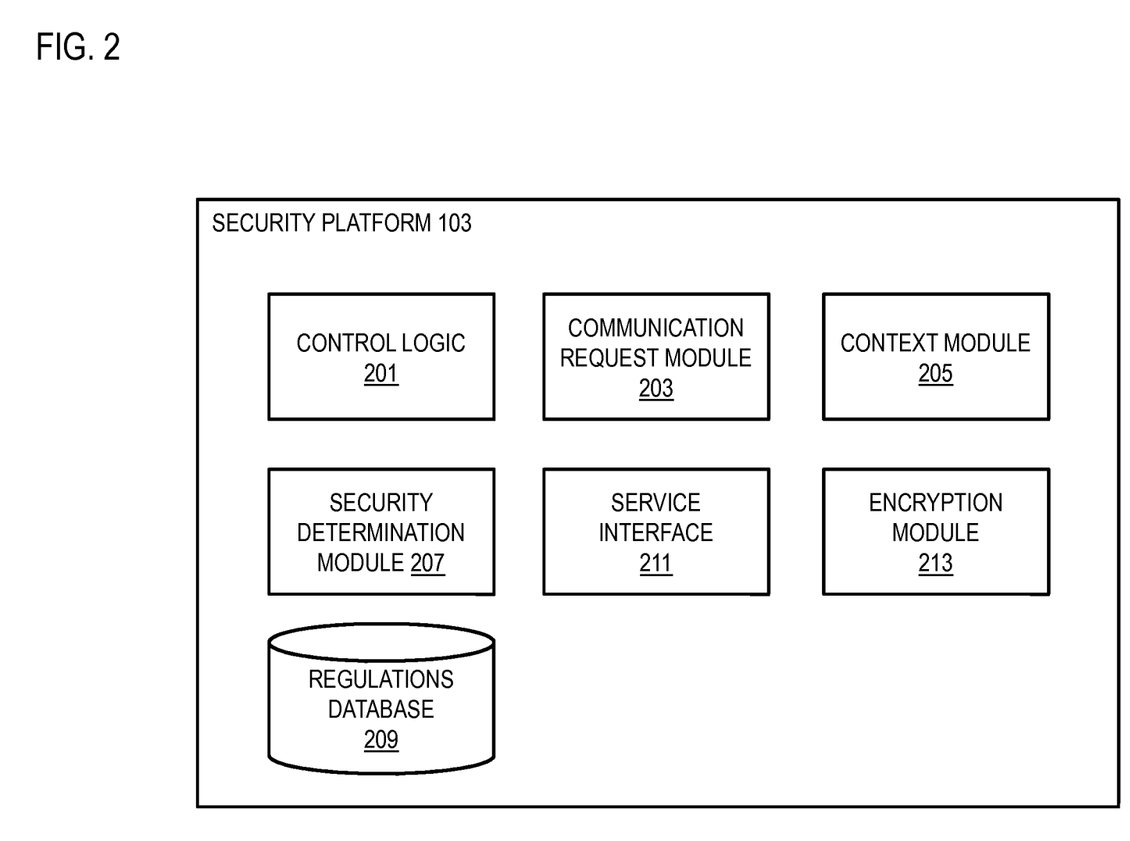
FIG. 2 is a diagram of the components of a security platform, according to one embodiment.

FIG. 2 is a diagram of the components of the security platform 103, according to one embodiment. By way of example, the context processing platform 109 includes one or more components for processing context information for determining an appropriate encryption cipher. It is contemplated that the functions of these components may be combined in one or more components or performed by other components of equivalent functionality. In one embodiment, the security platform 103 includes at least a control logic 201 which executes at least one algorithm for executing functions of the security platform 103. In one embodiment, the control logic 201 interacts with a communication request module 203 to determine (e.g., receive or intercept) communication or service requests from the UEs 101 to the service provider 107, the services 109, the content providers 111, a load balancer, a TLS accelerator and/or an intermediary, e.g., a content delivery network like Akamai, that handles the governmental requirements for client connection cipher selection and hides that from the service provider.

If the communication request includes a request to establish a secure communication session, the communication request module 203 interacts with the context module 205 to begin processing the request. In this embodiment, the context module 205 determines the context information received as part of the communication request. For example, the context module 205 can determine the location of the requesting UE 101 from a network address (e.g., an Internet protocol (IP) address associated with the originating UE 101. In one embodiment, the context module 205 may include a table or other database of MNCs/MCCs that have been associated with one or more IP subnets. By comparing a network address of the UE 101 to the table or database, the context module can derive the MNC and/or MCC associated with the UE 101 for determining the location information.

In addition or alternatively, the context module 205 can process context information that is received from the UE 101 to determine the location of the UE 101. For example, the context module 205 may determine a location of the UE 101 based on information received from any of sensors 113, a network address, any GPS, geo-location information, and the like. In addition to location information, the context module 205 may determine any other potentially relevant context information or other general context information (e.g., time, activity, user history, user behavior, etc.) received about the UE 101 or the user of the UE 101 so that the context may be used to determine an appropriate encryption cipher or security protocol.

For example, general context information refers to, at least in part, all contextual data, user data and user-to-device interaction data (e.g., date, time of day, location, activity, motion, position, modality, spatiotemporal element, etc.) as collected, and can be used for determining a present state or modality of the device. In addition, context information can be determined through analysis of historical data pertaining to the user or device, so as to enable a means of predicting to a degree to certainty expected or future device states or modalities. For example, if it is observed that a user frequently executes a particular application defining a context relative to the user based on this tendency. Hence, the compilation of context information can be analyzed appropriately, including referenced with respect to additional data and/or a context model, for enabling the context of a device, device user or one or more other associated users and their respective devices to be determined accordingly.

As previously noted, in certain embodiments, context information may also include data transmitted during an instance of device engagement with the service provider 107 over the communication network 105. Also, by way of example, context information may pertain to any data gathered by one or more sensors 113 of the device, said data representing sensory phenomena useful for characterizing the present moment interaction between the device and one or more devices, objects or users. Exemplary sensors 113 may include, but is not limited to, a sound recorder, light sensor, global positioning system (GPS) and/or spatio-temporal detector, temperature sensor, motion sensor, accelerometer, gyroscope, camera and/or any other device for perceiving sensory and environmental phenomena. Objects for which the device may interact may include, but is not limited to, other user devices (e.g., cell phones), peripheral devices such as Bluetooth headsets, keyboards and server devices or entities within the immediate environment or context of use such as buildings, landmarks, machines, vehicles or people.

In one embodiment, the context module 205 can process probe data (e.g., any information or data that may be processed relating to information about a geographic location and any occurrences that may be happening at or near that geographic location) to further verify the location and/or context information that is received from the UE 101. By way of example, the context module 205 can confirm the location information determined from, for instance, the IP address originating the probe data. For example, if multiple probe data indicate that the originating IP address is constant, then the context module 205 can have increased confidence that the determined context or location information is accurate. In the case where location data that is self-reported by the UE 101, the location information determined from the probe data (e.g., the IP address) can be compared to the reported location information to verify accuracy. In other words, the context module 205 may determine probe data that is associated with the UE 101a and may use the probe data to verify the detected network address, network code and/or country code associated with the UE 101n.

Based, at least in part, on the determined context information, a security determination module 207 of the security platform 103 can determine an appropriate security protocol or encryption cipher to apply to the requested communication session. In one embodiment, the security determination module 207 has connectivity to a regulations database 209 that includes information on regulations, restrictions, practices, etc. associated with operating one or more security protocols and/or encryption ciphers with respect to one or more jurisdictions. In regulations database 209 is created by any means by which a security, regulatory or government agency may openly communicate its encryption, or lawful interception, protocols with the service provider 107. For example, the service provider 107 may create its own database of such regulatory information, or determine the regulations from other databases. In certain embodiments, the security determination module 207 may also use context information about the source of the dataset that is requested by the UE 101 when determining which encryption cipher the dataset should be sent with.

In one embodiment, governing authorities may provide the information directly to the service provider 107. For example, the security determination module 207 may receive an input for specifying a range of network addresses, some of which may be suspect or flagged on a watch list by the security platform 103. The security determination module 207 may then compare a detected network address of a UE 101 with the range of network addresses to determine the appropriate encryption cipher based on the comparison. For example, the governing authority may specify and individual address or range of addresses or identifiers associated with one or more UEs 101 subject to security restrictions (e.g., lawful interception). In this way, the regulations database can include both generally applicable regulatory restrictions and/or restrictions specific to particular UEs 101, wherein the restrictions relate to what security protocols and/or ciphers can be applied.

In one embodiment, the security determination module 207 can then provide or identify the determined security protocol and/or encryption ciphers to the service provider 107 via the service interface 211. In one embodiment, the service provider 107 can store the location information and associated encryption cipher for future use. In this way, the service provider 107 need not request the determination from the security platform 103 for subsequent requests from the same UE 101 or other UEs 101 in a similar location.

In one embodiment, the service provider 107 then allows transmission of the requested dataset or communication session to the UE 101 and encrypts the dataset or session using the appropriate encryption cipher in, for example, a Transport Layer Security or Secure Sockets Layer protocol for the detected location. In this way, the service provider remains in compliance with the any applicable regulations (e.g., including LI regulations that permit security and/or government agencies to lawfully decrypt the communication session) while still enabling privacy protection using the highest level of security or encryption permitted in a particular jurisdiction. Alternatively, if there is not an encryption protocol for the detected area, the service provider 107 may transmit the requested dataset to the UE 101 in a manner that is encrypted with a strong encryption cipher, such as the 256-bit cipher, as discussed above. Accordingly, under the various embodiments of the approach described herein, the service provider 107 has the flexibility to support multiple levels or forms of encryption depending on the requirements of the local jurisdiction of the requesting UE 101.

In some embodiments, the security platform 103 may include an encryption module 213 capable of supporting any of the ciphers that might be specified or determined for a jurisdiction. The encryption module 213 can then perform the appropriate encryption for the service provider 107 in case the service provider does not support a particular encryption cipher or security protocol determined for the requesting UE 101.

Figure 3:
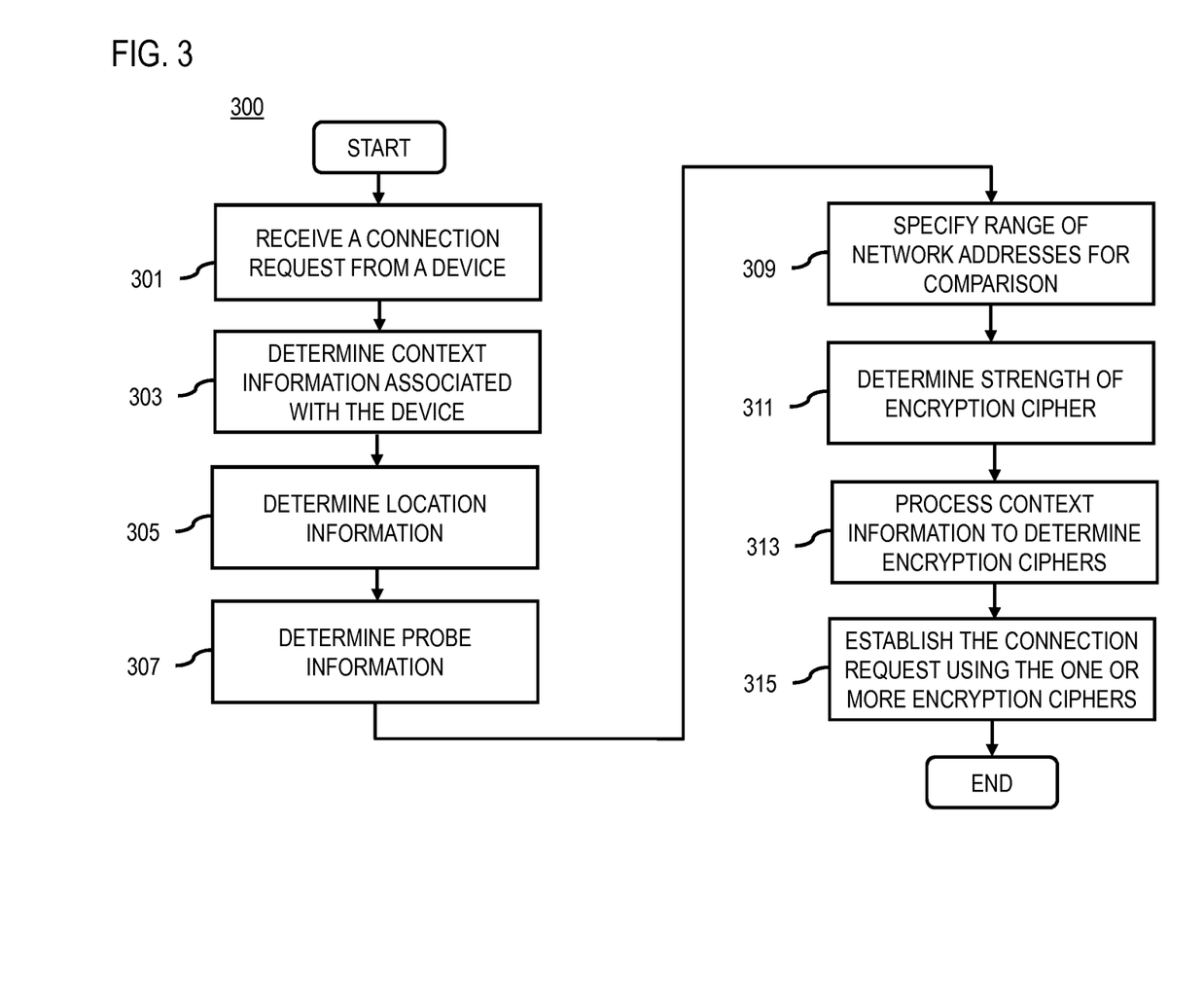
FIG. 3 is a flowchart of a process for determining an appropriate encryption cipher, according to one embodiment.
Figure 5:
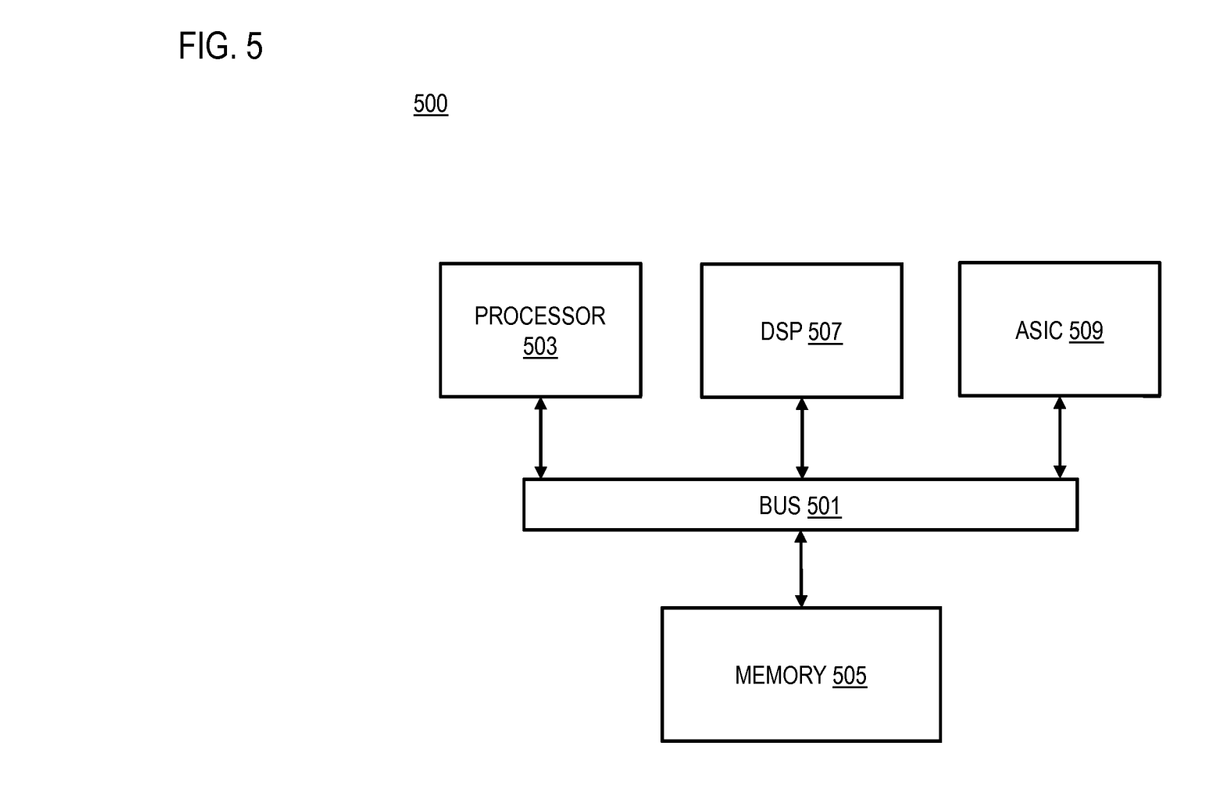
FIG. 5 is a diagram of a chip set that can be used to implement an embodiment of the invention.

FIG. 3 is a flowchart of a process for determining an appropriate encryption cipher, according to one embodiment. In one embodiment, the security platform 103 performs the process 300 and is implemented in, for instance, a chip set including a processor and a memory as shown in FIG. 5. In addition or alternatively, the service provider 107 may perform all or a portion of the process 300.

In step 301, the security platform 103 receives a connection request from a UE 101. By way of example, the connection request can include a request to establish a secure connection for exchanging information between the UE 101 and the service provider 107, the services 109, and/or the content provider 111 to which the request is directed. The process continues to step 303 in which the security platform 103 determines context information associated with the UE 101, a user of the UE 101, or a combination thereof for determining an encryption cipher or security protocol to apply to establish the requested connection. As described above, the context determination step can be based, at least in part, on (1) information implicitly provided as part of the connection request, such determining context information from an IP address associated with the requesting UE 101, (2) explicitly reported by the requesting UE 101 based, at least in part, on one or more sensors 113 of the UE 101, or (3) a combination thereof. In one embodiment, the security platform 103 sources to provide for confirmation and/or increased accuracy.

Steps 305 and 307 provide additional details of the context determination step of step 303. For example, in step 305, the security platform 103 processes and/or facilitates a processing of the context information to determine location information, wherein the one or more encryption ciphers are determined based, at least in part, on the location information. In one embodiment, the security platform 103 determines the location information based, at least in part, on a network address, a network code, a country code, or a combination thereof associated with the UE 101. As described above, location information is one factor that the security platform 103 can use to determine which security protocol or encryption cipher to apply.

In step 307, the security platform 103 can determine previously stored probe data associated with the UE 101, and then processes and/or facilitates a processing of the probe data to determine to verify the context information (e.g., the network address, the network code, the country code, the location information, etc.) determined in steps 305 and/or 307. For example, the probe data may be geospatial and/or temporal data that are automatically exchanged when a secure connection is established under protocols such as TLS and/or SSL. This probe data enables the security platform 103 to develop a database of information to match encryption requirements for a communication without having to use GPS data or MCC/MNC data from the source device, and/or determining location information such as a country of origin. In this step, the security platform 103 determines whether information in the probe data (e.g., a network address) matches previously determined information and may use to probe data to determine an encryption requirement and/or location information such as a country of origin.

In step 309, the security platform 103 may receive an input (e.g., from a governing or security authority) that specifies a range of network addresses to which particular regulations, security protocols, encryption ciphers, etc. apply. For example, if permitted by regulations, a governing authority may have specific interest in applying a particular encryption cipher or security protocol to one or devices or UEs 101 operating within its jurisdiction. For example, the encryption cipher or security protocol can support one or more lawful interception requirements of a locality associated with the device. In this case, the authority can provide the specific targeted network addresses to the service provider 107. In another embodiment, an administrator may specify a range of addresses that are specific to certain locations to which different security and/or encryption ciphers apply. For example, if a country requires a certain cipher, then the range of network addresses assigned or otherwise determined to be associated with devices operating in that country can be specified.

In step 311, the security platform 103 consults, for instance, the regulations database 209, to determine an appropriate strength of the encryption cipher based on the determined context information. By way of example, the strength of the encryption cipher is set by a governmental authority, a regulatory entity, the service provider 107, or a combination thereof. In one embodiment, security platform 103 stores this information to determine what level of encryption (e.g., how many bits, what encryption schemes or algorithm) to apply. In one embodiment, the strength can be specified by identifying specific encryption ciphers. In other embodiments, the encryption can be specified by one or more criteria. Then, the security platform 103 can select one or more encryption ciphers conforming to those criteria.

In step 313, the security platform 103 processes and/or facilitates processing of the context information (and the other information determined in the above steps) to determine one or more encryption ciphers appropriate to the context and the applicable regulations. In cases where the no regulations exist for a particular location, the security platform 103 can determine a default protocol or cipher (e.g., a strong cipher) to apply. In step 315, the security platform 103 collects source address and MNC/MCC relations and stores this information in a database. The process continues to step 317 in which a country of origin is determined based on the information in the database. The ability to use the database which collects the source address and MNC/MCC relations enables determining the country of origin of the client without the client to sending any assistance data such as GPS data or MNC/MCC data. This is an alternate way for determining the cipher suite if there is not any available source IP range information provided by other means. Other means than the MCC/MNC may be available to determine the country of origin based on the source IP address such as external geo IP databases for which the security platform 103 may consult. Once, the encryption cipher is determined, the security platform 103 (e.g., in cooperation with the service provider 107) causes, at least in part, an establishment of the connection request using, at least in part, the one or more encryption ciphers (step 319).

The processes described herein for determining an appropriate encryption cipher may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 4:
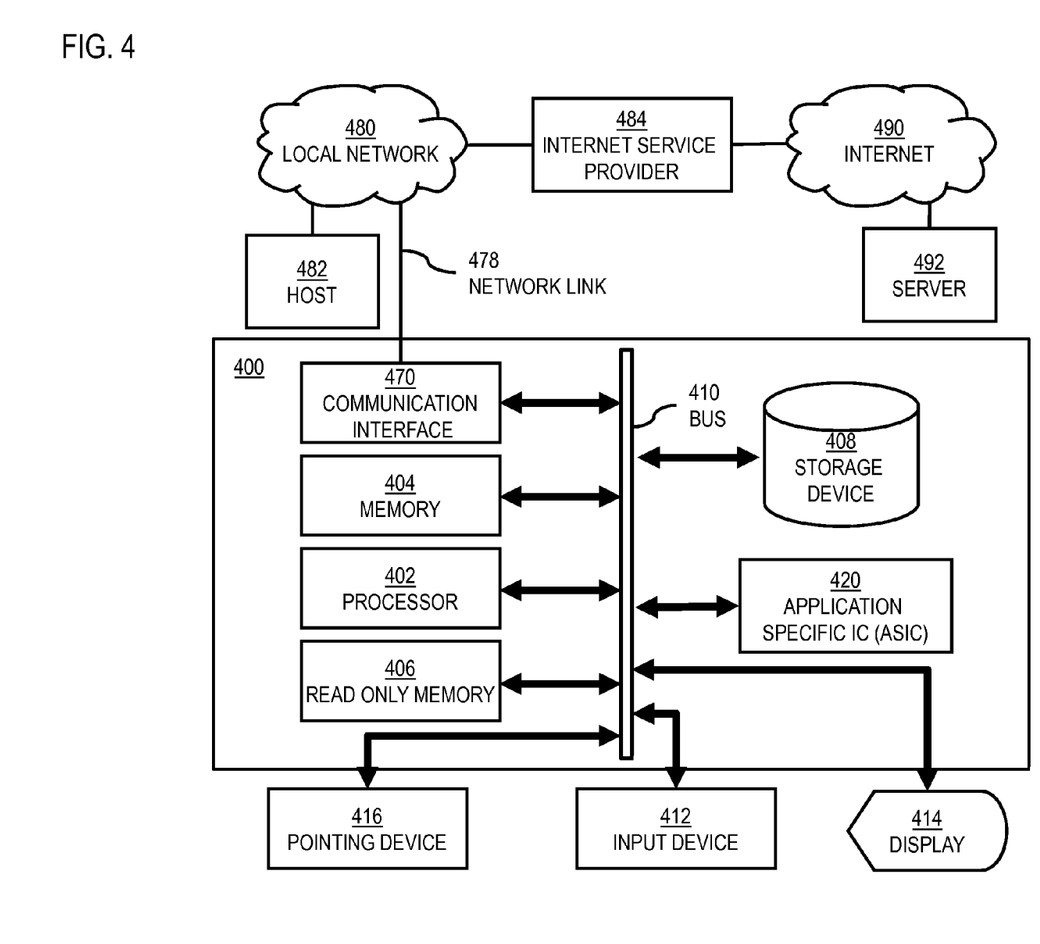
FIG. 4 is a diagram of hardware that can be used to implement an embodiment of the invention.

FIG. 4 illustrates a computer system 400 upon which an embodiment of the invention may be implemented. Although computer system 400 is depicted with respect to a particular device or equipment, it is contemplated that other devices or equipment (e.g., network elements, servers, etc.) within FIG. 4 can deploy the illustrated hardware and components of system 400. Computer system 400 is programmed (e.g., via computer program code or instructions) to determine an appropriate encryption cipher as described herein and includes a communication mechanism such as a bus 410 for passing information between other internal and external components of the computer system 400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of determining an appropriate encryption cipher.

A bus 410 includes one or more parallel conductors of information so that information is transferred quickly among devices coupled to the bus 410. One or more processors 402 for processing information are coupled with the bus 410.

A processor (or multiple processors) 402 performs a set of operations on information as specified by computer program code related to determine an appropriate encryption cipher. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 410 and placing information on the bus 410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 400 also includes a memory 404 coupled to bus 410. The memory 404, such as a random access memory (RAM) or any other dynamic storage device, stores information including processor instructions for determining an appropriate encryption cipher. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of processor instructions. The computer system 400 also includes a read only memory (ROM) 406 or any other static storage device coupled to the bus 410 for storing static information, including instructions, that is not changed by the computer system 400. Some memory is composed of volatile storage that loses the information stored thereon when power is lost. Also coupled to bus 410 is a non-volatile (persistent) storage device 408, such as a magnetic disk, optical disk or flash card, for storing information, including instructions, that persists even when the computer system 400 is turned off or otherwise loses power.

Information, including instructions for determining an appropriate encryption cipher, is provided to the bus 410 for use by the processor from an external input device 412, such as a keyboard containing alphanumeric keys operated by a human user, or a sensor. A sensor detects conditions in its vicinity and transforms those detections into physical expression compatible with the measurable phenomenon used to represent information in computer system 400. Other external devices coupled to bus 410, used primarily for interacting with humans, include a display device 414, such as a cathode ray tube (CRT), a liquid crystal display (LCD), a light emitting diode (LED) display, an organic LED (OLED) display, a plasma screen, or a printer for presenting text or images, and a pointing device 416, such as a mouse, a trackball, cursor direction keys, or a motion sensor, for controlling a position of a small cursor image presented on the display 414 and issuing commands associated with graphical elements presented on the display 414. In some embodiments, for example, in embodiments in which the computer system 400 performs all functions automatically without human input, one or more of external input device 412, display device 414 and pointing device 416 is omitted.

In the illustrated embodiment, special purpose hardware, such as an application specific integrated circuit (ASIC) 420, is coupled to bus 410. The special purpose hardware is configured to perform operations not performed by processor 402 quickly enough for special purposes. Examples of ASICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a one-way or two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends or receives or both sends and receives electrical, acoustic or electromagnetic signals, including infrared and optical signals, that carry information streams, such as digital data. For example, in wireless handheld devices, such as mobile telephones like cell phones, the communications interface 470 includes a radio band electromagnetic transmitter and receiver called a radio transceiver. In certain embodiments, the communications interface 470 enables connection to the communication network 105 for determining an appropriate encryption cipher for a connection to the UE 101.

The term "computer-readable medium" as used herein refers to any medium that participates in providing information to processor 402, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 408. Volatile media include, for example, dynamic memory 404. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 420.

Network link 478 typically provides information communication using transmission media through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490.

A computer called a server host 492 connected to the Internet hosts a process that provides a service in response to information received over the Internet. For example, server host 492 hosts a process that provides information representing video data for presentation at display 414. It is contemplated that the components of system 400 can be deployed in various configurations within other computer systems, e.g., host 482 and server 492.

At least some embodiments of the invention are related to the use of computer system 400 for implementing some or all of the techniques described herein. According to one embodiment of the invention, those techniques are performed by computer system 400 in response to processor 402 executing one or more sequences of one or more processor instructions contained in memory 404. Such instructions, also called computer instructions, software and program code, may be read into memory 404 from another computer-readable medium such as storage device 408 or network link 478. Execution of the sequences of instructions contained in memory 404 causes processor 402 to perform one or more of the method steps described herein. In alternative embodiments, hardware, such as ASIC 420, may be used in place of or in combination with software to implement the invention. Thus, embodiments of the invention are not limited to any specific combination of hardware and software, unless otherwise explicitly stated herein.

The signals transmitted over network link 478 and other networks through communications interface 470, carry information to and from computer system 400. Computer system 400 can send and receive information, including program code, through the networks 480, 490 among others, through network link 478 and communications interface 470. In an example using the Internet 490, a server host 492 transmits program code for a particular application, requested by a message sent from computer 400, through Internet 490, ISP equipment 484, local network 480 and communications interface 470. The received code may be executed by processor 402 as it is received, or may be stored in memory 404 or in storage device 408 or any other non-volatile storage for later execution, or both. In this manner, computer system 400 may obtain application program code in the form of signals on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

FIG. 5 illustrates a chip set or chip 500 upon which an embodiment of the invention may be implemented. Chip set 500 is programmed to determine an appropriate encryption cipher as described herein and includes, for instance, the processor and memory components described with respect to FIG. 4 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 500 can be implemented in a single chip. It is further contemplated that in certain embodiments the chip set or chip 500 can be implemented as a single "system on a chip." It is further contemplated that in certain embodiments a separate ASIC would not be used, for example, and that all relevant functions as disclosed herein would be performed by a processor or processors. Chip set or chip 500, or a portion thereof, constitutes a means for performing one or more steps of providing user interface navigation information associated with the availability of functions. Chip set or chip 500, or a portion thereof, constitutes a means for performing one or more steps of determining an appropriate encryption cipher.

In one embodiment, the chip set or chip 500 includes a communication mechanism such as a bus 501 for passing information among the components of the chip set 500. A processor 503 has connectivity to the bus 501 to execute instructions and process information stored in, for example, a memory 505. The processor 503 may include one or more processing cores with each core configured to perform independently. A multi-core processor enables multiprocessing within a single physical package. Examples of a multi-core processor include two, four, eight, or greater numbers of processing cores. Alternatively or in addition, the processor 503 may include one or more microprocessors configured in tandem via the bus 501 to enable independent execution of instructions, pipelining, and multithreading. The processor 503 may also be accompanied with one or more specialized components to perform certain processing functions and tasks such as one or more digital signal processors (DSP) 507, or one or more application-specific integrated circuits (ASIC) 509. A DSP 507 typically is configured to process real-world signals (e.g., sound) in real time independently of the processor 503. Similarly, an ASIC 509 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 500 includes merely one or more processors and some software and/or firmware supporting and/or relating to and/or for the one or more processors.

The processor 503 and accompanying components have connectivity to the memory 505 via the bus 501. The memory 505 includes both dynamic memory (e.g., RAM, magnetic disk, writable optical disk, etc.) and static memory (e.g., ROM, CD-ROM, etc.) for storing executable instructions that when executed perform the inventive steps described herein to determine an appropriate encryption cipher. The memory 505 also stores the data associated with or generated by the execution of the inventive steps.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of data, information, or at least one signal, based, at least in part, on the following:
    at least one interception requirement of a first jurisdiction targeted at a first user, a mobile device associated with the first user, or a combination thereof;
    a connection request, to an apparatus of a network operator of an access network, for connecting with the mobile device that is an end point of a communications connection, wherein the communications connection is referenced in the connection request;
    context information associated with the mobile device, the access network, the first user, the communications connection, or a combination thereof, wherein the context information includes a location of the mobile device at the time of the connection request;
    an analysis of a network address associated with the mobile device to verify the location of the mobile device;
    a processing of the context information including the location of the mobile device and the communications connection to determine one or more encryption ciphers provided by one or more user privacy requirements of a second jurisdiction as applicable to another end-point of the connection request at the time of the connection request; and
    an establishment of the communications connection by the apparatus using at least one of the encryption ciphers provided by the one or more user privacy requirements of the second jurisdiction, wherein the at least one of the encryption ciphers supports the at least one interception requirement of the first jurisdiction.

2. A method of claim 1, wherein the location of the device is further based, at least in part, on a network code, a country code, or a combination thereof associated with the device.

3. A method of claim 1, wherein the data, information, or at least one signal, are further based, at least in part, on the following:
    probe data associated with the device; and
    a processing of the probe data to verify the network address, wherein the network address is a source internet protocol address.

4. A method of claim 3, wherein the source internet protocol address is verified against the network code, the country code, a one or more sets of probe data or a combination thereof.

5. A method of claim 3, wherein the one or more encryption ciphers operate via one or more cryptographic protocols including, at least in part, a transport layer security protocol or a secure sockets layer protocol,
    wherein the network address is analyzed during a period since a transmission control protocol connection is established until starting the transport layer security protocol or the secure sockets layer protocol.

6. A method of claim 1, wherein the data, information, or at least one signal, are further based, at least in part, on the following:
    an input for specifying a range of network addresses; and
    a comparison of the network address associated with the device against the range of network addresses, wherein the network address associated with the device is a source internet protocol address, and wherein the one or more encryption ciphers are determined based, at least in part, on the comparison.

7. A method of claim 1, wherein the data, information, or at least one signal, are further based, at least in part, on the following:

a processing of the context information to determine a strength of encryption for the connection request, wherein the one or more encryption ciphers are determined based, at least in part, on the strength of the encryption.

8. A method of claim 1, wherein the strength of encryption is specified, at least in part, by a governmental authority, a regulatory entity, a service provider, or a combination thereof.

9. A method of claim 1, wherein the location of the device includes a country of origin, and the data, information, or at least one signal, are further based, at least in part, on the following:

a collection of source internet protocol addresses and mobile network code/mobile country code relations in a database; and a determination of the country of origin based, at least in part, on the database.

10. A method of claim 1, wherein the at least one user privacy requirement of the first jurisdiction provides one or more encryption ciphers that are weaker than the one or more encryption ciphers provided by the one or more user privacy requirements of the second jurisdiction.

11. A method of claim 1, wherein the data, information, or at least one signal, are further based, at least in part, on the following:

when the one or more encryption ciphers provided by the one or more user privacy requirements of the second jurisdiction do not support the at least one interception requirements of the first jurisdiction, a change of the one or more encryption ciphers by the apparatus into one encryption cipher supporting the at least one interception requirements for the communications connection, while privacy of one or more other communications connections remains protected with the one or more encryption ciphers provided by the one or more user privacy requirements.

12. An apparatus comprising:

at least one processor; and at least one memory including computer program code for one or more programs, the at least one memory and the computer program code configured to, with the at least one processor, cause the apparatus of a network operator of an access network to perform at least the following;

receive at least one interception requirement of a first jurisdiction targeted at a first user, a mobile device associated with the first user, or a combination thereof;

receive a connection request for connecting with the mobile device that is an end point of a communications connection, wherein the communications connection is referenced in the connection request;

determine context information associated with the mobile device, the access network, the first user, the communications connection, or a combination thereof, wherein the context information includes a location of the mobile device at the time of the connection request;

analyze a network address associated with the mobile device to verify the location of the mobile device;

process and/or facilitate a processing of the context information including the location of the mobile device and the communications connection to determine one or more encryption ciphers provided by one or more user privacy requirements of a second jurisdiction as applicable to another end-point of the connection request at the time of the connection request; and establish the communications connection by the apparatus using at least one of the encryption ciphers provided by the one or more user privacy requirements of the second jurisdiction, wherein the at least one of the encryption ciphers supports the at least one interception requirement of the first jurisdiction.

13. An apparatus of claim 12, wherein the location of the device is further based, at least in part, on a network code, a country code, or a combination thereof associated with the device.

14. An apparatus of claim 12, wherein the apparatus is further caused to:

determine probe data associated with the device; and process and/or facilitate a processing of the probe data to verify the network address, wherein the network address is a source internet protocol address.

15. An apparatus of claim 14, wherein the source internet protocol address is verified against the network code, the country code, a one or more sets of probe data or a combination thereof.

16. An apparatus of claim 12, wherein the apparatus is further caused to:

receive an input for specifying a range of network addresses; and cause, at least in part, a comparison of the network address associated with the device against the range of network addresses, wherein the network address associated with the device is a source internet protocol address, and wherein the one or more encryption ciphers are determined based, at least in part, on the comparison.

17. An apparatus of claim 12, wherein the apparatus is further caused to:

process and/or facilitate a processing of the context information to determine a strength of encryption for the connection request, wherein the one or more encryption ciphers are determined based, at least in part, on the strength of the encryption.

18. An apparatus of claim 12, wherein the strength of encryption is specified, at least in part, by a governmental authority, a regulatory entity, a service provider, or a combination thereof.

19. An apparatus of claim 12, wherein the location of the device includes a country of origin, and the apparatus is further caused to:

determine to collect source internet protocol addresses and mobile network code/mobile country code relations in a database; and determine the country of origin based, at least in part, on the database.

20. An apparatus of claim 12, wherein the one or more encryption ciphers operate via one or more cryptographic protocols including, at least in part, a transport layer security protocol or a secure sockets layer protocol.

* * * * *